3,342,730
METHOD FOR PRODUCING SOFT WATER
Kazuhiko Mihara, Tokyo, and Takashi Yamashiki, Yokohama, Japan, assignors to Asahi Kasei Kogyo Kabushiki Kaisha, Osaka, Japan, a corporation of Japan
No Drawing. Filed Aug. 20, 1963, Ser. No. 303,407
Claims priority, application Japan, Aug. 22, 1962, 37/34,870
1 Claim. (Cl. 210—38)

This invention relates to an improved method for producing soft water.

There have previously been known two methods for producing neutral, soft water from weakly alkaline, hard water. Namely, they are as follows:

(1) A neutralization method in which hydrochloric acid, sulphuric acid or the like is used.

(2) A method using synthetic cation exchange resins.

Although the former method is simple, it is not of interest because the total concentration of salt in the water increases by the use thereof. In the latter method which is now commercially used, a synthetic cation exchange resin which has adsorbed Ca and Mg ions is separated into two series. In one series, the adsorbents are regenerated with sodium chloride, and in the other series the adsorbents are regenerated with hydrochloric acid. Hard water is then passed through both series of the resin whereby the water is softened. Acidic soft water is produced in one series, alkaline soft water in the other series and the soft water from both series are mixed to produce neutral soft water. The respective amount of water passed through each series is determined in advance according to the desired pH of the product water. This method entails the disadvantage of having to use two series of resins, and also the inconvenience caused when the pH of the feed water fluctuates.

The object of this invention is to provide a method free of the above-mentioned disadvantages in producing soft water. Namely, the object of this invention is to provide a method for producing soft water from hard water which is simple, and does not raise the total salt concentration of the water. Another object of this invention is to provide a method which enables production of soft water of any desired pH by use of a specifically prepared regenerant.

According to the present invention, when soft water is to be made from alkaline hard water, regeneration is effected by the use of a mixture of sodium chloride and hydrochloric acid thereby making the ratio of the Na-form of the exchange resin to the H-form of the exchange resin an appropriate value. The amount of hydrochloric acid which it is necessary to mix with sodium chloride must be sufficient to produce an amount of hydrogen ion which when adsorbed in the exchange resin will neutralize the alkalinity corresponding to the pH differential between hard water and soft water. By use of the thusly regenerated exchange resin, soft water having any desired value of pH can be produced.

The method of the present invention has the following advantages:

(1) The total salt concentration of the produced soft water is not raised.

(2) Satisfactory results are obtained by the use of one series of ion exchange resin.

(3) Even if the pH of the feed water fluctuates, it is possible to obtain soft water of a given pH by varying the ratio of sodium chloride and the hydrochloric acid.

It goes without saying that the so-called fixed bed method and the moving bed method can be used in the practical operation of this invention. In the fixed bed method, the ion exchange resin does not move; the soft water production cycle, and the regeneration cycle are repeated alternately and intermittently in one vessel.

In the moving bed method, ion exchange resin which has been regenerated in a separate vessel is introduced either intermittently or continuously into a soft water production vessel which discharges the corresponding amount of ion exchange resin to be recycled to a regeneration vessel.

In order to show the practice of this invention, the following examples are illustrated.

Example 1

Soft water having total hardness of less than 3 mg./l. is prepared by treating hard water of the following composition at the rate of 1 m.$^3$/hr., with a cation exchange resin "Diaion SK#1" (trade name):

| | Mg./l. (as $CaCO_3$) |
|---|---|
| Total hardness | 100 |
| Alkalinity | 50 |
| Total salt concentration | 300 |

The amount of hardness removed is 2 eq./hr., and the amount of alkali removed is 1 eq./hr. Resins to be employed for the removal of hardness are R—Na 1 eq./hr., R—H 1 eq./hr., since removal of hardness can be effected with H-form resins. Resins after being adsorbed in the above hard water in equilibrium amount has almost completely adsorbed Ca and Mg, since selective adsorbability of Ca+Mg in dilute solution (total salt concentration 6 p.p.m.) is extremely large, and no leakage of hard composition occurs at the time of adsorption even when hard composition remains in the amount up to half of total ability for adsorption in the regenerated resins. Taking these facts into account, regeneration of resin which has adsorbed in hard water in equilibrium amount with regenerant, regenerated resin and soft water of the following composition is obtained:

| | |
|---|---|
| Composition of regenerant | NaCl 1.5 N. |
| | HCl 0.8 N. |
| Amount of regenerant | 1.47 liter/hr. |
| Composition of resin after regeneration | R—Na 0.6 meq./cc. of resin. |
| | R—H 0.5 meq./cc. of resin. |
| Composition of soft water | Total hardness less than 3 mg./l. (as $CaCO_3$) |

PH 6.8±0.3.

Example 2

Soft water is prepared in accordance with Example 1 employing hard water of the following composition:

| | Mg./l. (as $CaCO_3$) |
|---|---|
| Total hardness | 100 |
| Alkalinity | 30 |
| Total salt concentration | 300 |

The rate of treatment is 1 m.$^3$/hr., the amount of hardness removed is 2 eq./hr., and the amount of alkali removed is 0.6 eq./hr. R—Na 1.4 eq./hr., R—H 0.6 eq./hr. are sufficient for the component of resin to remove hardness. The resin is regenerated as in Example.

| | |
|---|---|
| Composition of regenerant | NaCl 1.5 N. |
| | HCl 0.5 N. |
| Amount of regenerant | 1.6 liter/hr. |
| Composition of resin after regeneration | R—Na 0.8 meq./cc. of resin. |
| | R—H 0.3 meq./cc. of resin. |

The soft water obtained in this example is the same as that obtained in Example 1.

What we claim is:

A method employing a cation exchange resin for producing soft water having a given value of pH from hard water, which method comprises contacting the hard water with a cation exchange resin which is a mixture of the Na-form and the H-form, said mixture having been prepared by treating a cation exchange resin, having hardness ions at the exchange sites thereof, with an NaCl regenerant solution containing an acid, the amount of acid being such as to lower the pH of the hard water being treated to the desired pH of the soft water.

No references cited.

JOSEPH SCOVRONEK, *Primary Examiner.*

MORRIS O. WOLK, E. G. WHITBY,
*Assistant Examiners.*